United States Patent [19]
Gehlhaar et al.

[11] Patent Number: 5,892,916
[45] Date of Patent: Apr. 6, 1999

[54] NETWORK MANAGEMENT SYSTEM AND METHOD USING A PARTIAL RESPONSE TABLE

[76] Inventors: Jeff B. Gehlhaar, 11934 Dapple Way, San Diego, Calif. 92128; James W. Dolter, 11755 Timberlake Dr., San Diego, Calif. 92131-2329; Siddharth R. Ram, 7920 Avienda Navidad, #147, San Diego, Calif. 92122; Rahul Anand, 927 Wilbur Ave., #3, San Diego, Calif. 92109

[21] Appl. No.: 997,160

[22] Filed: Dec. 23, 1997

[51] Int. Cl.⁶ .................................................. G06F 9/40
[52] U.S. Cl. ............................................... 395/200.53
[58] Field of Search ...................... 364/DIG. 1 MS File, 364/DIG. 25 MS File; 395/200.3, 200.32, 200.53

[56] References Cited

U.S. PATENT DOCUMENTS 5,561,769  10/1996  Kumar et al. ...................... 395/200.32
5,651,006  7/1997  Fujino et al. ...................... 395/200.53
5,832,226  11/1998  Suzuki et al ...................... 395/200.53

*Primary Examiner*—Robert B. Harrell
*Attorney, Agent, or Firm*—Russell B. Miller; Bruce W. Greenhaus; Christopher O. Edwards

[57] ABSTRACT

A system and method for network management, including a message handling process, having a network manager and at least one network element is described. The network management messaging system sends and receives multiple concurrent messages between the network element layer and the network management layer. Support of concurrent messaging greatly speeds and simplifies network management. A client request is received at a first managed object, at least part of the client request is fulfilled by a second managed object. A major row is created in response to receiving the client request, and a minor row associated with a managed object request sent to the second managed object. The minor row has an index that associates the minor row with the major row, and correlates a response to the managed object request with the client request.

4 Claims, 8 Drawing Sheets

NETWORK MANAGEMENT SYSTEM AND METHOD USING A PARTIAL RESPONSE TABLE

BACKGROUND OF THE INVENTION

I. Field of the Invention

The present invention relates generally to network management systems, and more specifically is directed toward management of network resources using distributed intelligence and state management.

II. Related Art

Telecommunication service providers provide a wide range of services to their customers. These services range from the transport of a standard 64 kbit/s voice channel (i.e., DS0channel) or subrate thereof to the transport of higher rate digital data services (e.g., video). Both voice channels and digital data services are transported over the network via a hierarchy of digital signal transport levels. For example, in a conventional digital signal hierarchy 24 DS0 channels are mapped into a DS1 channel. In turn, 28 DS1 channels are mapped into a DS3 channel. The number of customers served and the complexity of services offered by telecommunication service providers is always increasing.

The wide range of services, signals and channels require a complex network of telecommunications equipment. Management of the complex telecommunications network is necessary in order to maintain optimum levels of service to the customer as well as efficiency in the maintenance and usage of the equipment itself. As networks grow increasingly complex, both in the size of the network and the range of services provided by the network, network management becomes increasingly important. Telecommunications service providers provide for management of the network by implementing network management systems designed to manage, provide for growth and ensure optimum performance of the network.

Network management systems include at least two layers. The first layer is the network management layer. The network management layer includes a network manager that monitors and controls the configuration of the network. The network manager is usually a server and software that maintains a logical representation of the state and condition of the network. The network manager provides an interface to the network for users and applications wishing to manage the network.

The second layer of the network is the network element layer. The network element layer includes all of network elements. Examples of network elements are the mobile switching center (MSC), call detail adjunct (CDA), home location registry (HLR), channel service unit (CSU), customized dial plan (CDP), CDMA interconnect subsystem (CIS), etc. The network elements provide the functionality and services of the entire network, independent of the network manager.

The network management system implements a set of procedures, software, equipment and operations designed to keep the network operating near maximum efficiency. The goals of network management include configuration management, fault location and repair management, security management, and performance management.

Configuration management deals with installing, initializing, loading, modifying and tracking configuration parameters, network elements and their associated software. The network manager accomplishes configuration management by downloading configuration parameters and software to the network elements. The network manager also tracks the configuration of the network by retrieving data indicating the configuration of the network elements and their associated software.

Fault location and repair management predicts and diagnoses problems with the network and provides a methodology for replacing or rerouting the network around the affected network elements. The network manager accomplishes fault location and repair management by retrieving fault information from the network elements in the network element layer. For example, the network manager may retrieve the number of severely errored seconds (SES) or the frame error rate (FER) from a network element in order to locate faults and diagnose problems with the network. If, upon retrieval of fault information from the network element layer, the network manager determines that particular network elements are experiencing degraded performance or are inoperative, the network manager may reroute the network around the affected elements. The network manager accomplishes the rerouting function by downloading additional configuration information to the network elements in order to reconfigure the network.

Security management allows the network manager to restrict access to various resources in the network, thereby giving customers different levels of access to different network resources. The network manager accomplishes security management by retrieving the current security information from the network elements and analyzing the retrieved information. If the access to resources in the network is to be changed, the network manager accomplishes the change by downloading additional or changed security information to the network elements, thereby changing the levels of access the users have to the network resources.

Performance management provides statistical information about the network's operation allowing the network manager to manage the resources of the network to ensure optimum performance. The network manager monitors the usage and traffic levels of the network element to ensure that the traffic on the network is properly distributed. Proper distribution of traffic among the network elements helps to ensure that the network does not experience performance degradation because a few network elements are carrying most of the communications load, while other network elements are carrying too little. The network manager accomplishes performance management by retrieving information pertaining to the traffic loading of the particular network elements. If the network manager determines that the performance of the network would be improved by redistributing the network traffic from one set of network elements to another, the network manager downloads additional configuration information to the network elements, thereby reconfiguring them.

Network management, therefore, is accomplished by communication between the network manager and the network elements. A telecommunications network may contain tens of thousands of network elements. A network manager, therefore, may be interacting with thousands of elements at a time. It is not practical for the network manager to spend time establishing synchronous connections with each of the network elements that it wishes to communicate with, if it must establish thousands of such connections to manage the network.

A more practical solution to the problem of communication between the network manager and the network elements is asynchronous communication. In asynchronous communication, messages containing requests, commands and data are transmitted between the network manager and network elements over the network. In such a system, messages transmitted from a network element before others may arrive at the network manager after the later transmitted message. Context information about the network management system, therefore, may not be assumed or inferred since a received message may not reflect the current state of the system.

Asynchronous communications pose additional management problems. Often, when the network manager sends a message to a network element, it must wait for a response. The management functions of the network manager often require information to be retrieved from multiple subsystems. If the network includes thousands of network elements, this serial process of messaging and response becomes too slow for practical network management. Current asynchronous packet network management systems are unable to handle concurrent outstanding messages sent to the subsystems.

Furthermore, messages between the network elements and network manager perform differing functions. Some messages communicate information, or data, between the network manager and the network elements, or between the network elements themselves. Other messages cause actions to be performed. Current messaging systems for network management implement different systems to accommodate the different types of network management messages.

Additionally, a network may contain multiple hierarchical layers. In order for a network manager to communicate with the multiple layers, current messaging systems require the implementation of multiple messaging protocols. Multiple messaging protocols allow the network manager to communicate with network elements existing at multiple levels within the network management system hierarchy. Multiple network management protocols make the communication between the network manager and the network elements, as well as between the network elements themselves, complex and error prone.

What is needed, therefore, is a network management messaging system which is capable of sending and receiving multiple concurrent messages to the network element layer from the network management layer. Such a system would greatly increase the speed with which the network can be managed. The network management messaging system should provide a universal message handling method that handles both information and action messages. Such a system should also provide for interacting with network elements at differing levels within the network management hierarchy, and between the network elements themselves.

SUMMARY OF THE INVENTION

The present invention comprises a comprehensive network management messaging system that can efficiently accomplish network management though asynchronous messaging between the network entities. The network management messaging system is capable of sending and receiving multiple concurrent messages to the network element layer from the network management layer. Support of concurrent messages greatly speeds and simplifies network management. The network management messaging system of the present invention provides a universal message handling method that handles both information and action messages. The network management messaging system of the present invention also provides for hierarchical interaction with network elements at differing levels within the network management hierarchy, and between the network elements themselves.

In the present invention, a plurality of network entities are defined for a plurality of managed network resources which include physical (e.g., network element hardware) and logical (e.g., circuit termination points) resources. A network entity is any network manager, network element, user or system that originates network management messages in the network management system.

The present invention comprises a system and method for network management, including a message handling process, having a network manager and at least one network element. The system and method includes receiving a client request at a first managed object, at least part of the client request being fulfilled by a second managed object. The system and method creates a major row in response to receiving the client request, and a minor row associated with a managed object request sent to the second managed object. The minor row has an index that associates the minor row with the major row, and correlates a response to the managed object request with the client request.

BRIEF DESCRIPTION OF THE DRAWINGS

The features, objects, and advantages of the present invention will become more apparent from the detailed description set forth below when taken in conjunction with the drawings in which like reference numbers indicate identical or functionally similar elements. Additionally, the left-most most digit of a reference number identifies the drawing in which the reference number first appears.

FIG. 3 is a diagram illustrating the format of a message according to the present invention;

FIG. 4 is a diagram illustrating the format of a message element according to the present invention;

DETAILED DESCRIPTION OF THE INVENTION

In the description that follows, the first portion describes the messaging system. The second portion describes the partial response table. Both of these features comprise elements of this invention.

Messaging System

Figure 1:
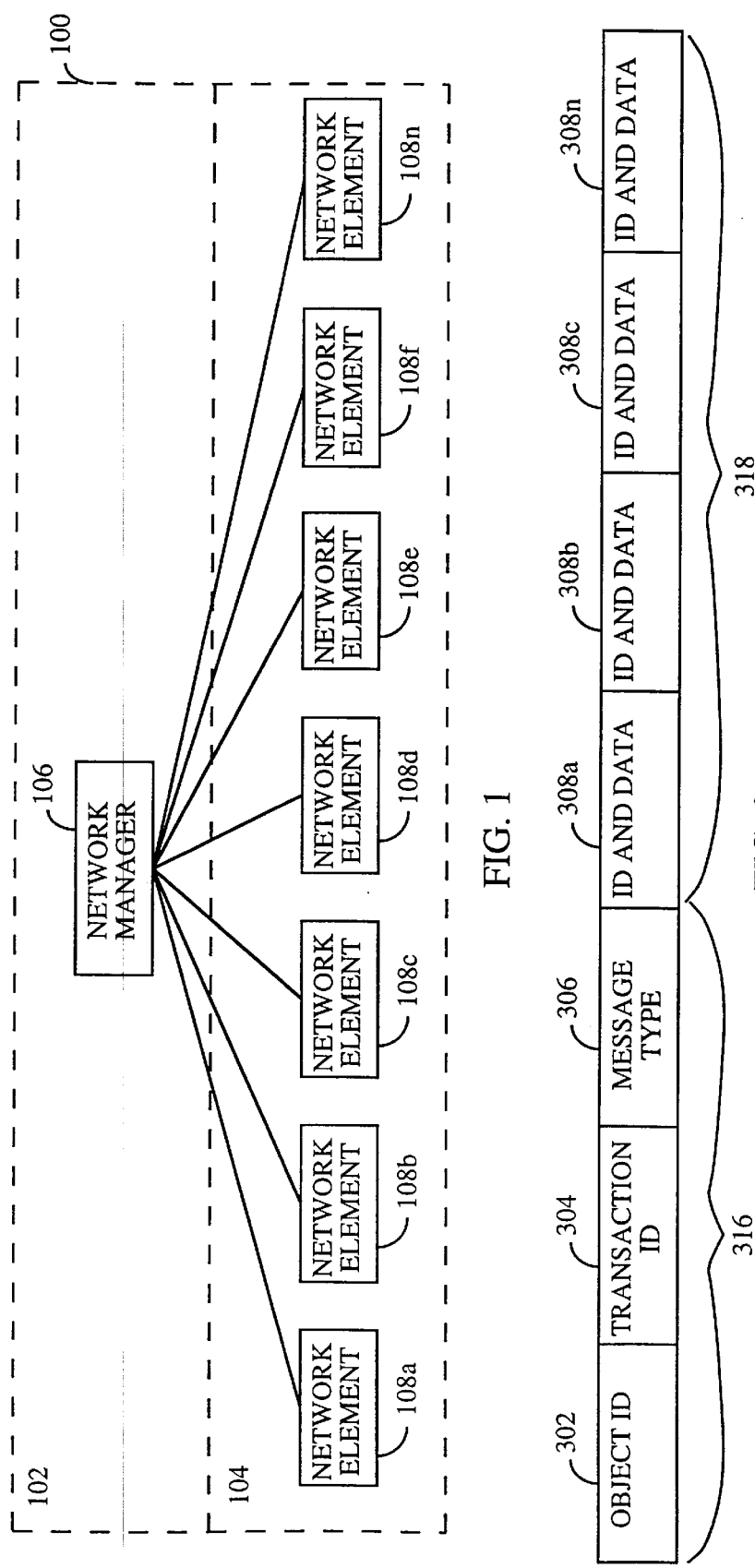
FIG. 1 is a block diagram of one embodiment of a network management system in accordance with the present invention.

FIG. 1 illustrates a network management system 100 which is an example of the environment for one embodiment of the the present invention. Network management system 100 preferably complies with the International Telecommunications Union (ITU) telecommunications management network (TMN) standard. The TMN standard defines a layered framework for a service provider to implement its own network management processes.

Network management system 100 includes two layers 102 and 104. Layer 102 is the network management layer 102. Network management layer 102 comprises network manager 106. Network manager 106 is shown as a single entity. In implementation, network manager 106 can comprise equipment or software present at one or more sites. For example, multiple service centers (not shown) can exist in different parts of the country (e.g., east coast and west coast). Network manager 106 can also be split among services and/or network elements. For example, in one embodiment, a first portion of the network manager is dedicated to satellite-based communications, and a second portion of the network manager is dedicated to cell-based communications. Generally, the network manager 106 is accessed by client applications, such as users and systems, to engage network management functions. Client applications access network manager 106 by transmitting messages to the manager 106 and receiving messages from the manager.

Layer 104 is designated as the network element layer 104. Network element layer 104 is a physical layer that includes various network elements (e.g., mobile switching center, call detail adjunct, home location registry, channel service unit, customized dial plan, CDMA inner connect subsystem, etc.) used in the transport and routing of network traffic. Each network element 108a–108n in network element layer 104 receives and transmits configuration, fault location, security and performance information associated with management of the network. In particular, network elements 108a–108n are connected to network manager 106 in network management layer 102. The present invention is applicable to, and contemplates, handling of any management information passed between client applications and the network manager 106, or network manager 106 and network elements 108a–108n.

Although the present invention is described as having only two layers, alternative embodiments of network management system 100 have a plurality of layers. For example, in accordance with one embodiment of the present invention, the network management system has a plurality of network management layers (more than two) hierarchically arranged. In another alternative embodiment, network management systems are arranged hierarchically. In in one embodiment having multiple network management system layers, network manager 106 interacts with network elements 108a–108n through a plurality of communications protocols. In one such embodiment, each layer in the network management system interacts with the network manager 106 using a different protocol. Alternatively, network manager 106 interacts with network elements 108a–108n through an intervening network management layer (i.e., network manager 106 would interact with a first network entity, which in turn would interact with a second network entity in a different layer). In general, a network entity is any network manager, network element, user or system that originates network management messages in the network management system 100. However, the first and second network entity referred to here are preferably software applications that are responsible for controlling the interaction between the layers of the system.

In the preferred embodiment, network management system 100 is a message based system. Client applications, such as users, applications or systems, interact with network manager 106 by transmitting messages to the manager 106. The messages usually contain requests or commands and are usually packetized. Likewise, network manager 106 communicates with network elements 108a–108n by transmitting and receiving similar messages. Such a messaging system is said to be asynchronous and transaction based. Transaction based systems rely upon messages and responses thereto in order to manage the network. This is contrasted with connection based systems in which dedicated connections are established between external entities and network manager 106 or between network manager 106 and network elements 108a–108n. In asynchronous message based systems, such as network management system 100, messages are transmitted without acknowledgment from the network system or network entity to which the message is transmitted.

Figure 2:
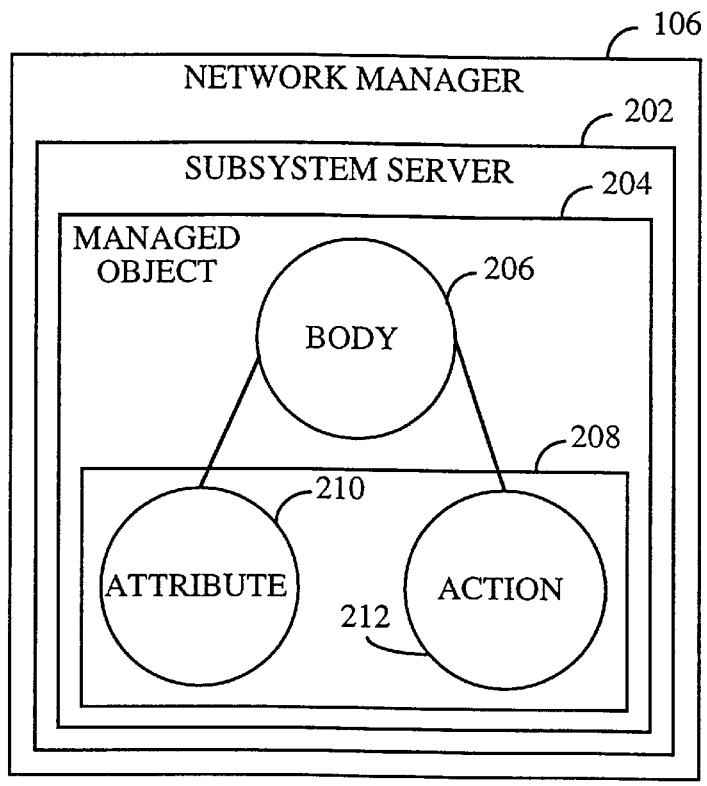
FIG. 2 is a block diagram illustrating one embodiment of the network manager in accordance with the present invention.

FIG. 2 further illustrates network manager 106. The preferred embodiment of network manager 106 is a server and software that maintains a logical representation of the state and condition of network management system 100. Network manager 106 monitors and controls the configuration of the network by interacting with network elements 108a–108n in network element layer 104. Client applications and other systems interact with and manage network elements 108a–108n in network element layer 104 through network manager 106.

Network manager 106 includes subsystem server 202. Subsystem server 202 is a software process or application that executes on network manager 106. Subsystem server 202 provides the interface for network manager 106 to all of the network entities, that are not part of the network manager 106. Network manager 106 receives messages from client applications attempting to interact with or control the network and passes them to subsystem server 202. In operation, subsystem server 202 is an application, running on a computer, which acts as a clearinghouse for all of the messaging that goes on within the network management system 100. Subsystem server 202 examines a message received from network manager 106 and determines to which managed object 204 the message is to be routed. One managed object 204 is shown in FIG. 2 for the sake of simplicity and ease of understanding. However, in the preferred embodiment of the present invention, many such managed objects 204 exist.

Each managed object 204 is a logical representation of a particular network element 108a–108n in the network management layer 102. Subsystem server 202 provides an environment for the execution of managed objects 204. Accordingly, each network element 108a–108n in network element layer 104 preferably has an associated representative managed object 204 on subsystem server 202. The managed objects 204 on network manager 106, therefore, are preferably a logical representation of all the network elements 108a–108n in network management layer 102. Managed objects 204 provide a logical interface at network manager 106 to the network element layer 104. The interface provides a means for the network manager 106 to communicate with, retrieve data from, and cause actions to be performed in the network element layer 104. In addition to managed objects 204 representing network elements 108a–108n, additional managed objects 204 may reside on subsystem server 202 to represent management functions available to users, applications and other systems interacting with network manager 106.

Managed object 204 comprises body 206 and characteristics 208. Characteristic 208 includes attributes 210, actions 212 or both. Body 206 controls the behavior of the managed object 204. Messages sent or received by managed object 204 within the network management system 100 are processed and generated by body 206. Body 206 receives, parses and distributes to characteristics 208 any messages received from network management system 100. Likewise, any message to be sent by managed object 204 are generated by body 206. Characteristics 208 represent the data (attributes 210) available for retrieval and storage by the network manager 106 and the functionality (actions 212) that is available at managed object 204 and corresponding network element 108a–108n. Network manager 106 sets and retrieves attributes 210 by sending and receiving messages from network element 108a. For example, managed object 204 will have data members corresponding to its associated network element 108a, including the data transmission error rate, number of errored seconds and number of severely errored seconds of the network element 108a. Actions 212 represent functionality available to network manager 106 at managed object 204 or corresponding network elements 108a–108n. Network manager 106 sends command messages to network element 108a–108n, causing network element 108a–108n to perform an action, and network element 108a–108n responds with a response message confirming the execution of the action. Together, attributes 210 and actions 212 represent the characteristics 208 of managed object 204.

Managed objects 204 are not constantly running on the subsystem server. Managed objects 204 only execute, or exist, on subsystem server 202 when a message for a particular managed object 204 has been received at subsystem server 202, and while the managed object 204 is processing the message. When managed objects 204 are not active, they are stored on persistent store off the subsystem server 202. Examples of persistent store are magnetic or optical media, read only memory (ROM), or other permanent type storage. Storage of the managed objects 204 on persistent store during periods of non-use promotes efficient use of network manager resources. If the message received by subsystem server 202 is destined for a managed object 204 which is not in existence on the subsystem server 202, subsystem server 202 retrieves the desired managed object 204 from persistent store and passes the message to the desired object 204. If the original message received from the external system by network manager 106 is directed to more than one managed object 204, subsystem server 202 parses the original message into pieces that are interpreted and acted upon by individual managed objects 204.

FIG. 3 illustrates one example of the format of a message 300 to a managed object 204, from another network entity, such as a user, application or system external to network management system 100. In accordance with one embodiment, the message 300 is routed through network manager 106. The format of message 300 is illustrated for the purposes of example. One of the advantages of the present invention is the protocol insensitivity of the messaging system and partial response table architecture. Accordingly, alternative embodiments of the present invention use message formats which differ from those described herein.

Message 300 includes header 316 and payload 318. Header 316 includes object identification (OID) 302, transaction identification (XID) 304, and message type 306. OID 302 identifies the particular managed object 204 for which message 300 is intended. For example, a message 300 intended for, or related to, network element 108a would have an OID 302 identifying the managed object 204 corresponding to a given network element 108a. If managed object 204 were to generate a message for transmission to network element 108a, the one-to-one correspondence between managed objects 204 and the network elements 108a–108n would allow the address of network element 108a to be algorithmically computed directly from OID 302.

XID 304 identifies the particular transaction with which message 300 is associated. For example, a message from a user external to network management system 100 to network manager 106 would have a unique XID 304. The response message from network manager 106 to the user would use the same unique XID 304, or an XID 304 which was algorithmically determinable from the original XID 304. The XID 304 provides for the identification and management of transaction, and transaction response, messages transmitted between entities in network management system 100. Unique XIDs 304 guarantee that concurrent messages do not result in corruption of the information passed between the network entities during network management. Message type 306 indicates the nature of the operation requested or specified by message 300. For example, message type 306 may indicate that message 300 is a "get-attribute" message. A get-attribute message is a request to retrieve data members stored by attributes 210 and respond with the value of attributes 210. Alternatively, message type 306 may specify that message 300 is a "set-attribute" message. A setattribute message is a request to set (or reset) the data values of attribute 210. Other examples of message types of the preferred embodiment include a response to a get-attribute message, a response to a set-attributemessage, an "action" message, a response to an action message, a "create-object" message and a "destroy-object" message for creating and destroying managed objects, etc. An action message requests that an action be performed at managed object 204. Since managed object 204 is a logical representation of network element 108a–108n, an action request message usually specifies actions to be performed at a network element 108a–108n corresponding to the managed object 204. In such cases, managed object 204 will send an additional action message to its corresponding network element 108a–108n. For example, in accordance with one embodiment of the present invention, a "lock-action" message is provided to network management system 100 to bar a particular resource from providing a service. In response, the network element specified in the lock-action message is essentially "locked out". An "unlock-action" message results in a locked network element or resource becoming "unlocked." Responses to action messages are usually action status messages that indicate that the action request was completed or was not completed. Managed objects 204 are created and destroyed on network manager 106 in order to maintain one-to-one correspondence between network elements 108a–108n and managed objects 204. For example, if network element 108a is added to network element layer 104, a corresponding managed object 204 must be created with a create-object message on network manager 106. Managed objects 204 on network manger 106 are also created and destroyed to implement and remove additional functionality at the network management layer 102. The create-object message is preferably sent from a client external to network manager 106. Alternatively, the initialization process of the network element 108a includes sending a create-object message to network manager 106. If network element 108a is removed from network element layer 104, the corresponding managed object 204 in network management 106 is removed with a destroy-object message.

Message 300 further includes payload 318 comprising identifier (ID) and data 308a–308n. Payload 318 identifies the particular characteristics 208 by which message 300 is to be implemented. ID and data 308a–308n are used by body 206 to generate message element 400 as described below. For example, when managed object 204 receives a set-attribute message, data value(s) in attributes 210 will change.

ID and data 308a–308n identify the particular characteristics 208 to which the message 300 is directed. For example, suppose message 300 is received by network manager 106. OID 302 identifies the particular managed object 204 to which message 300 is to be routed. Message 300 is routed by subsystem server 202 to managed object 204. Managed object 204 receives message 300. Body 206 of managed object 204 examines ID and data information 308a–308n of payload 318. Body 206 parses message 300 into smaller "message elements" to be passed to characteristics 208. Message type 306 of header 316 and ID and data 308a–308n of payload 318 are passed to characteristic 208 corresponding to ID and data 308a–308n of payload 318.

FIG. 4 illustrates the format of one example of a message element transferred between body 206 of managed object 204 and characteristics 208 of that object 204. As noted above, body 206 receives message 300 from the subsystem server 202 and parses it into at least one message element 400. Message element 400 includes an internal identifier (ID) 402, message type 306 and data 404. Internal ID 402 is determined from ID information in ID and data fields 308a–308n of payload 318. Internal ID 402 identifies the particular data member in characteristics 208 which is to be affected by the message. For example, internal ID 402 may identify an associated data value within attribute 210. The data value within attribute 210 may represent a feature, or a function in the network element 108a–108n associated with managed object 204.

Message type 306 within message element 400 is copied from message type 306 within message 300. Message type 306 identifies the type of message. For example, message type 306 may identify message 300 as a get-attribute message. Accordingly, when message type 306 is copied to message element 400, message element 400 is identified as a get-attribute message element. In such an example, body 206 would route message element 400 to attribute 210. The data field of the message element 400 would contain no data, since the data is to be retrieved from the target attribute 210. Internal ID 402 identifies the particular data member within attribute 210 from which data is being requested. Attribute 210 responds to the get-atrribute message element 400 by generating a response message element 400, including the values of the data members identified by internal ID 402 in attribute 210. The response message element 400 is sent to body 206 of managed object 204. The response message element 400 includes a message type 306 indicating that the message element is a get-attribute response message element. Internal ID 402 of the response message element 400 is unchanged, thereby identifying the response message element 400 as a response to the original get-attribute message element 400 when the message element 400 is received at the body 206. In an alternative embodiment, internal ID 402 of the response message element is algorithmically determined within attribute 210 based on the get-attribute message element Internal ID 402 received by the attribute 210 from the body 206.

FIGS. 3. and 4 illustrate embodiments of message 300 and message element 400 in accordance with the present invention. It should be noted, however, that one of the features of the present invention is the flexibility with which messaging systems, or protocols, can be accommodated. If, for example, the network management system 100 includes a plurality of hierarchical levels, the protocol of the messages and message elements can be changed to accommodate the nature of the network entities that will be receiving the messages.

Characteristics 208 on managed object 204 determine the nature of the messages to be sent from managed object 204 to network elements 108a–108n. For example, if managed object 204 receives a get-attribute request message, the message is parsed into message elements 400 and passed to the appropriate attribute 210 in managed object 204. If attribute 210 is associated with particular data values stored by network element 108a, managed object 204 preferably sends a get-attribute request message to network element 108a in order to retrieve the data associated with the get-attribute request message received by managed object 204.

Network element 108a receives the get-attribute request message from network manager 106 and responds by sending a get-attribute response message containing the data requested to network manager 106. The get-attribute response message is passed to managed object 204, where the get-attribute response message is parsed into message elements 400 as described above. Attribute 210 is updated with the data 404 in message element 400 from network element 108a. After attribute 210 is updated with data 404 from message element 400, attribute 210 sends a response message element 400 to body 206. Body 206 translates the response message element 400 into a response message 300 containing the data to be sent to the requesting client application.

Figure 5:
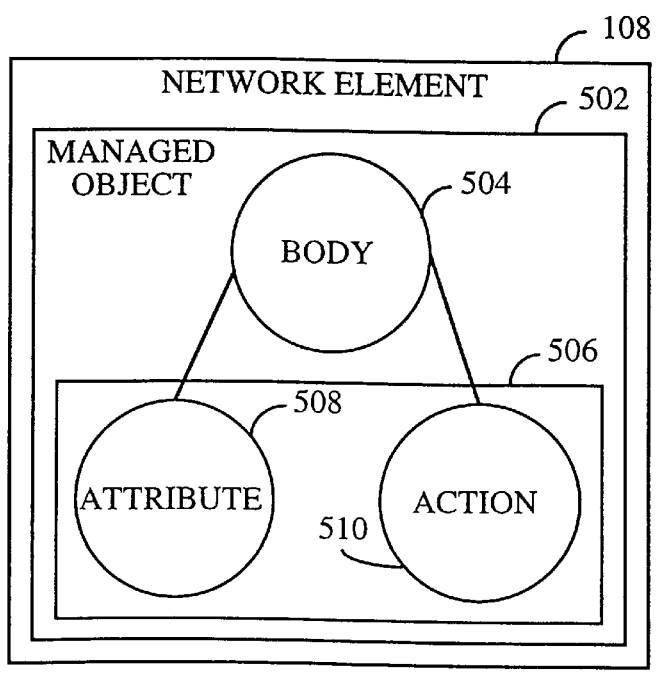
FIG. 5 is a block diagram illustrating one embodiment of a network element in accordance with the present invention.

FIG. 5 further illustrates one embodiment of the network element 108a. Network element 108a comprises managed object 502 which in turn comprises body 504 and characteristics 506. Characteristic 506 includes attributes 508, actions 510 or both. Body 504 controls the behavior of the managed object 502. Messages sent by managed object 502 to network manager 106 are processed and generated by body 206 within the network manager 106, as described above. In a manner similar to that described above with regard to managed object 204, any message sent by managed object 502 is generated by body 504. Characteristics 506 represent the data and functionality that is available at network element 108a–108n.

Managed object 502 interacts with the hardware of network element 108a. For example, message 300 is received from network manager 106 at network element 108a. OID 302 identifies the particular network element 108a and managed object 502 to which message 300 is directed. Managed object 502 parses received message 300 into message elements 400, at body 504. In one case, characteristics 506 respond to received message element 400 passed to them by body 504 by executing an action at the network element (e.g., switching a digital cross-connect, changing the configuration of the network element, etc.) or setting data attributes 508 with the data 404 in message 400. Alternatively, message 300 received at network element 108a may request information owned by network element 108a. In such instances, managed object 502 will formulate a response message 300 and transmit it over the network to network manager 106.

Partial Response Table

In the preferred embodiment, network management system 100 is a message based system. Clients, such as users, applications or systems, interact with network manager 106 by sending asynchronous messages. Network manager 106 in network management layer 102 communicates with network elements 108a–108n in network element layer 104 by transmitting and receiving similar messages. Such a messaging system is said to be transaction based. Transaction based systems rely upon the messages and responses thereto in order to accomplish the management of the network. In asynchronous message based systems, such as network management system 100, messages are transmitted without acknowledgment from the network management system or the entity to which the message is transmitted.

Modern telecommunications networks have tens of thousands of network elements. Asynchronous messaging systems ensure efficient use of network management resources. However, tracking the thousands of pending and outstanding messages between network manager 106 and network elements 108a–108n or between network manager 106 and the client poses a difficult management problem.

A partial response table in accordance with the present invention provides a mechanism for managing messages transmitted by network entities of network management system 100. For the purposes of explanation, the partial response table is described as a table with a series of related rows, or tuples. In actuality, the partial response table may be implemented on any addressable storage device, through the method described herein. In the preferred embodiment, a partial response table is implemented by each managed object 204, 502. Alternative embodiments of the partial response table may be implemented in the hardware of the network manager 106, network elements 108a–108n, subsystem server 202, or on an independent general computer system.

Figure 6:
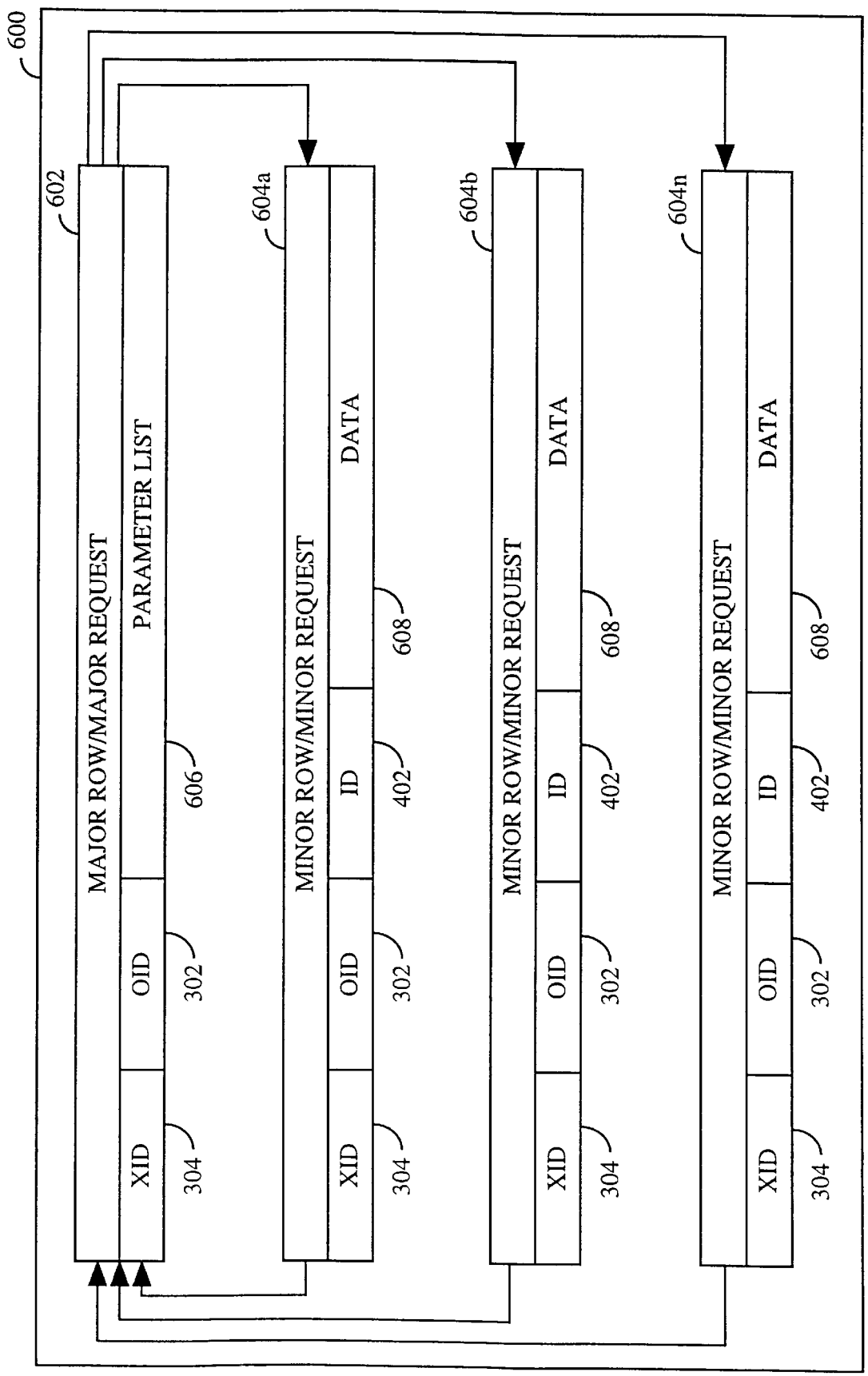
FIG. 6 is a diagram illustrating an entry in a partial response table.

FIG. 6 illustrates the preferred embodiment of partial response table 600. Each managed object 204, 502 preferably has a partial response table 600. In the preferred embodiment, when managed object 204, 502 receives a message 300, managed object 204, 502 creates a major row 602 in the partial response table 600 associated with the message 300. The major row 602 remains in the partial response table 600 until managed object 204, 502 responds to the message 300. If managed object 204, 502 must send secondary messages to retrieve the information or implement the command of message 300, minor rows 604a–n are added to the partial response table 600 associated with each secondary message sent to an additional network entity, such as a network element 108. When responses are received from the secondary messages, the associated minor rows 604 are deleted from the partial response table 600. The partial response table 600 and the process of addition and deletion of major and minor rows 602, 604 in response to transmission and reception of messages is described in more detail hereinbelow.

Partial response table 600 comprises at least one major row 602. Each major row 602 corresponds to a message received by managed object 204 or 502. Each major row in partial response table 600 is uniquely identified by XID 304 and OID 302. Each major row 602 of partial response table 600 includes a parameter list 606.

One major row 602 is created for each message from the client received by managed object 204, 502.. Each minor row 604a–604n is associated with a particular major row 602. Each minor row 604a–604n is uniquely identified by XID 304, OID 302 and ID 402. Each minor row 604a–604n also includes associated data 608. XID 304 and OID 302 of minor row 604a–604n allows managed object 204 to determine to which major row 602 each minor row 604a–604n belongs. Parameter list 606 is a set of data fields, each of which corresponds to a data member that will be transmitted in response to the message that corresponds to the minor row 604a–604n.

Figure 7:
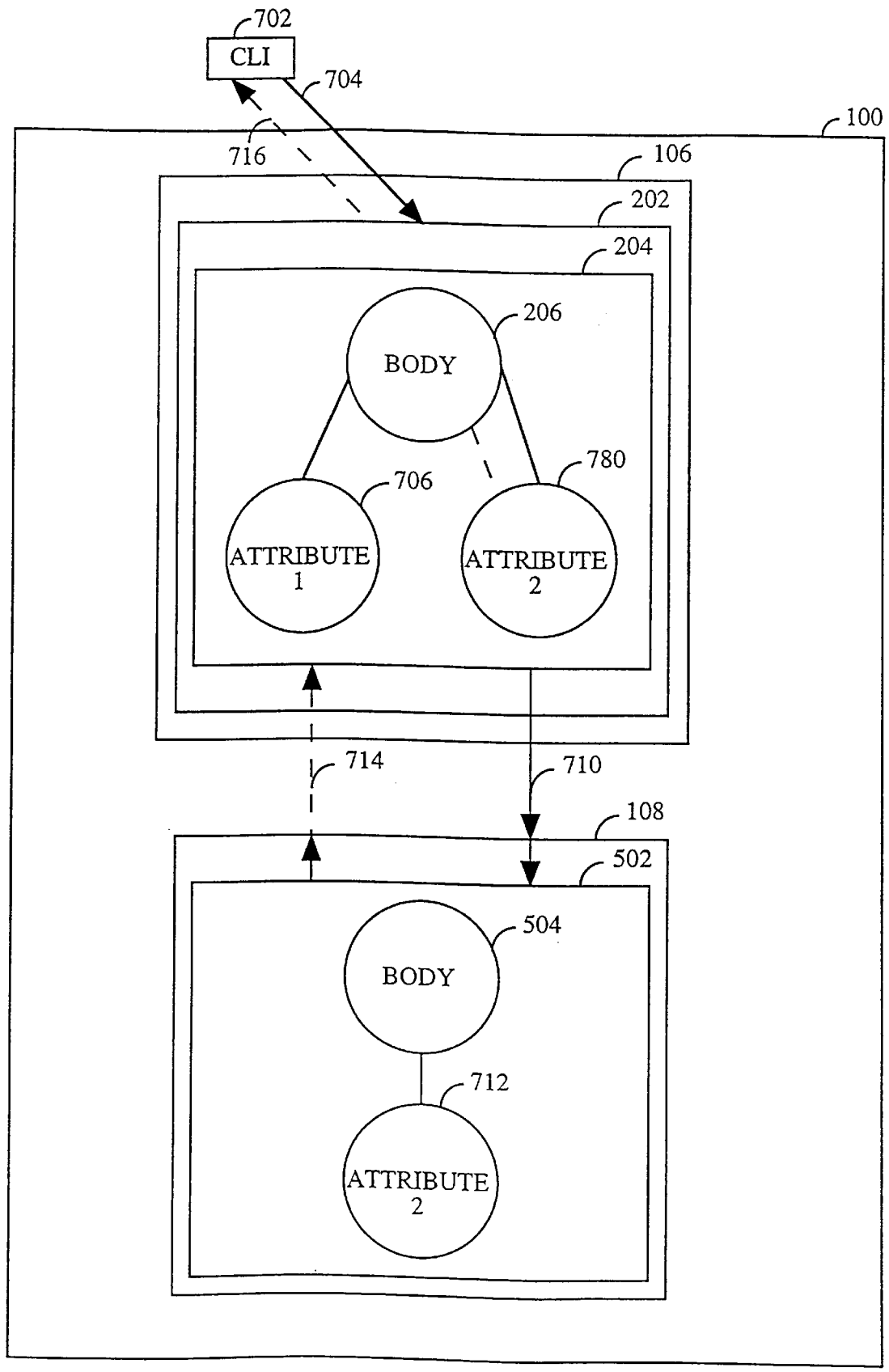
FIG. 7 is a diagram illustrating one embodiment of a network management system in accordance with the present invention.

FIG. 7 illustrates one example of a network management hierarchy. A brief overview of the operation messaging system will be described in conjunction with FIG. 7. The network management system of FIG. 7 will be used in conjunction with FIGS. 8–9 to describe the operation of the partial response table and method of the present invention in more detail below.

A command line interface (CLI) 702 is one example of a client application for accessing network management system 100. In accordance with one embodiment, CLI 702 is a terminal that controls the network elements in the network management hierarchy. Alternatively, CLI 702 is a software application designed to manage the network. However, it should be understood that CLI 702 may be any software, hardware, or combination which is capable of originating a request message 704. CLI 702 sends request messages 704 to network manager 106. Network manager 106 passes CLI request message 704 to subsystem server 202. Subsystem server passes CLI request message 704 to managed object 204. Managed object 204 processes CLI request message 704 according to the process of the present invention. Managed object 204 in turn generates a managed object request message 710 in response to CLI request message 704. Alternatively, the network manager 106 generates a message to send to the subsystem server 202 based upon the information contained in the CLI request message 702. Likewise, in one embodiment, subsystem server 202 generates a message to send to managed object 204 based upon the information contained in the message received by managed object 204 from subsystem server 202.

Network element 108a receives a managed object request message 710 and passes it to managed object 502. Managed object 502 processes request message 710 according to the present invention and responds by sending a managed object response message 714 to managed object 204. Response message 714 contains the data or action confirmation message corresponding to request message 710. Request message 710 and response message 714 represent a single "transaction."

Managed object 204 processes response message 714 according to the present invention and generates a CLI response message 716, which provides the data or action confirmation corresponding to CLI request message 704. Although the environment of the present invention is illustrated as a single network manager 106, managed object 204 and corresponding network element 108a and managed object 502, it should be understood that the environment of the present invention preferably includes thousands of such network entities and managed objects.

For the purposes of explanation, managed object 204 has data members represented by a characteristic 706 (attribute 1) and a characteristic 708 (attribute 2). Managed object 502 has a data member represented by the actual value of attribute 2 stored at characteristic 712. Attribute 2 of characteristic 708 is a logical representation at network manager 106 of actual data member in characteristic 712. In order for managed object 204 to respond to CLI 702 with the value of characteristic 708 (i.e., generate a CLI response message 716), the value of attribute 2 of characteristic 712 is preferably retrieved.

Figure 8A:
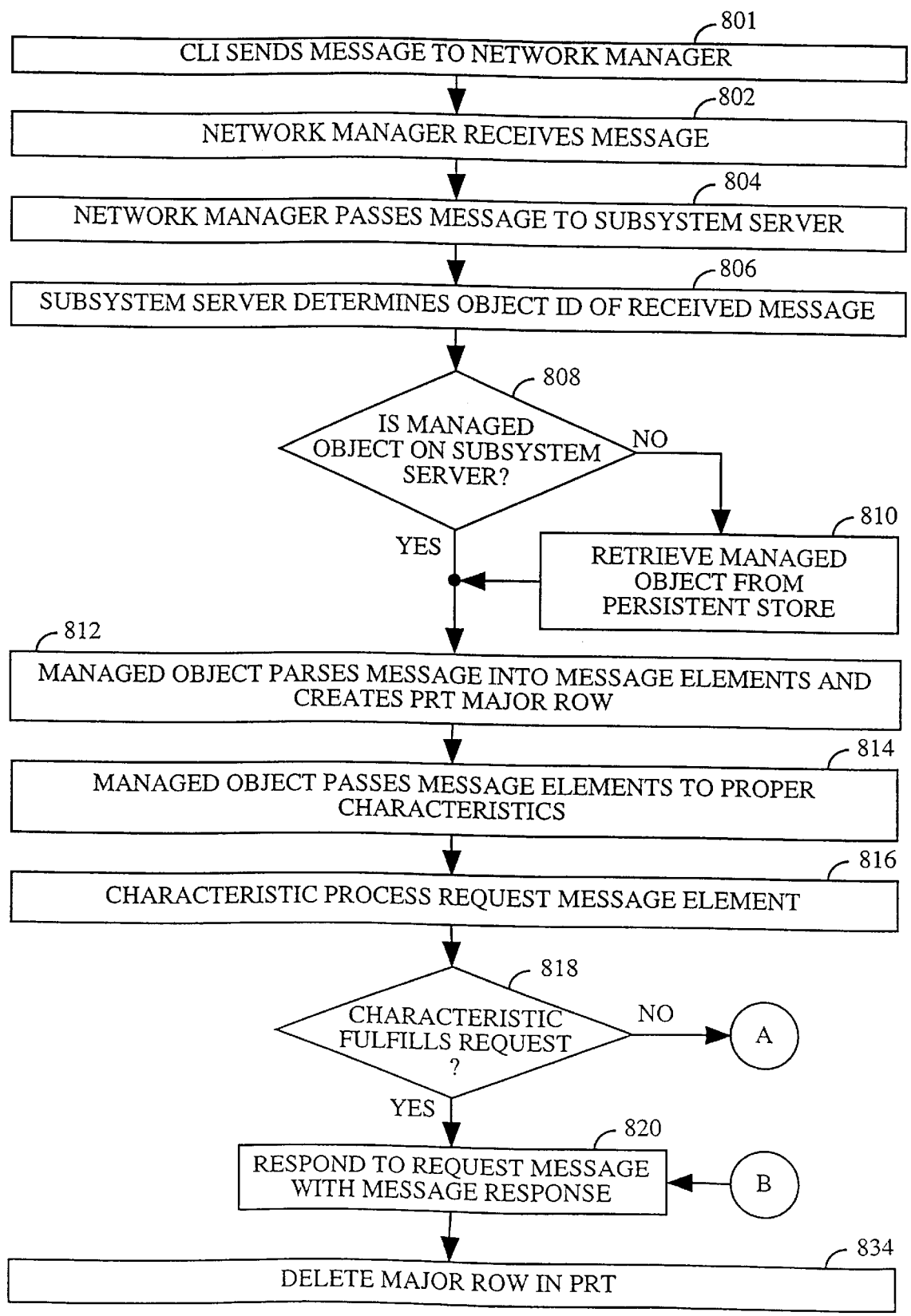
FIG. 8 is a flowchart illustrating the process of receiving a CLI request message at the network manager and generating a CLI response message.
Figure 8B:
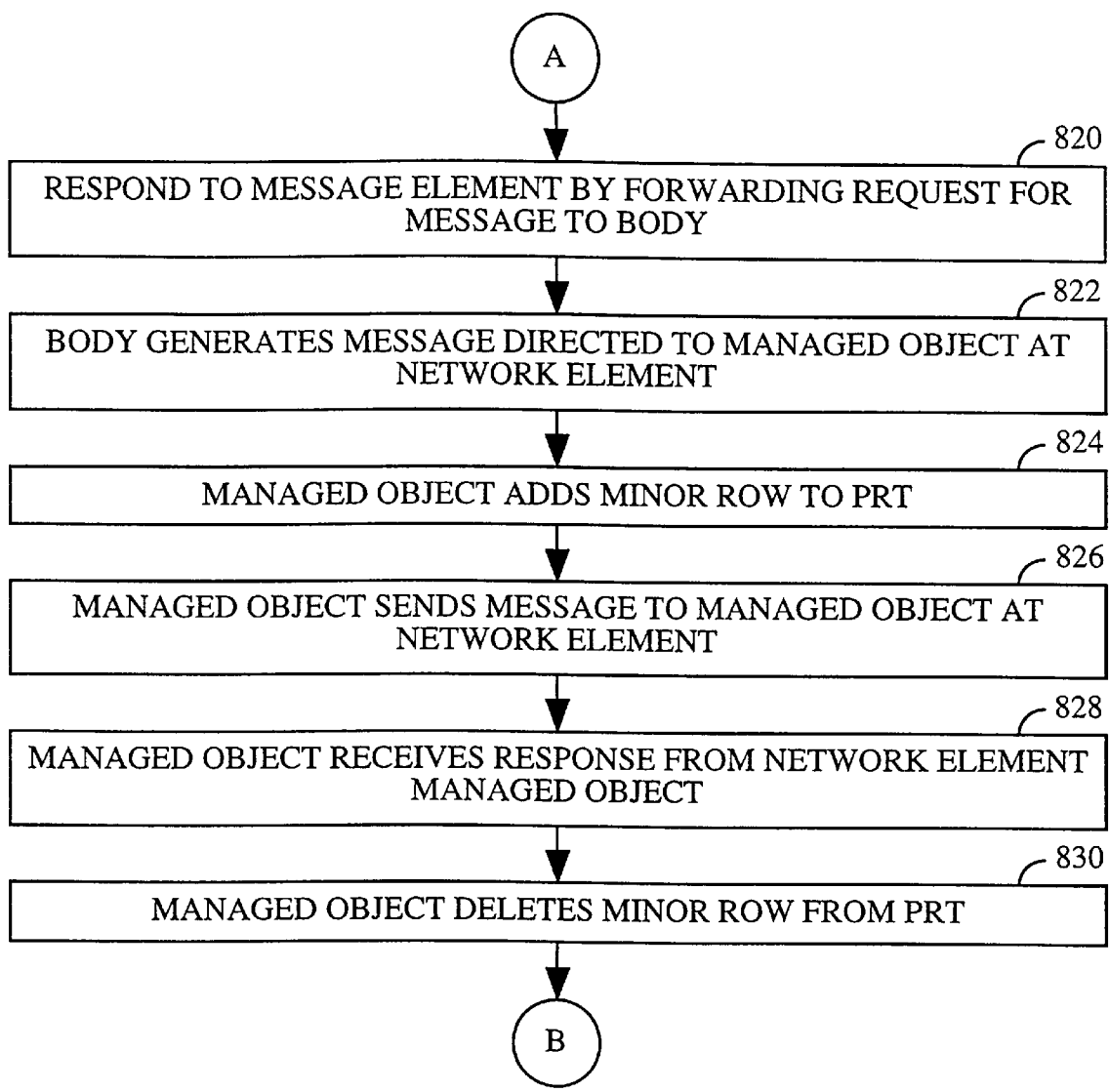

FIG. 8 illustrates the process of receiving a CLI request message 704 at network manager 106 and generating a CLI response message 716. Step 801 sends CLI request message 704 from CLI 702 to network manager 106. Step 802 receives CLI request message 704 at network manager 106. Step 804 passes received CLI request message 704 to subsystem server 202 from network manager 106. Step 806 receives CLI request message 704 and determines the OID 302 of the received CLI request message 704 at subsystem server 202. Step 808 determines whether managed object 204 identified by OID 302 is present on subsystem server 202. Step 810 retrieves managed object 204 identified by OID 302 from persistent store if it is not present on subsystem server 202, as determined by step 808. If, on the other hand, managed object 204 identified by OID 302 exists on the subsystem server when the message is received, the process continues at step 812.

If the managed object 204 identified by OID 302 exists on subsystem server 202, then, in step 812, managed object 204 parses CLI request message 704 into message elements 400 and creates major row 602 in the partial response table 600 associated with CLI request message 704. Major row 602 comprises XID 304, OID 302 and parameter list 606. Parameter list 606 is a set of data fields each of which corresponds to a data member that will be transmitted (i.e., outgoing parameters) in CLI response message 716 to CLI 702. For example, network manager 106 receives a request message from CLI 702 to provide the lock status of network element 108a. The lock status of network element 108a is expressed as a single data member. The parameter list 606 in the outgoing message from network element 108a, therefore, would contain a single data member representing the lock status of network element 108a.

In Step 814, body 206 passes each of the message elements 400 generated by step 812 to its associated characteristics 706, 708 in the managed object 204. In Step 816, the associated characteristics 706, 708 process each message element 400. In Step 818, the characteristics 706, 708 determine if an adequate response to message element 400 can be provided. In the preferred embodiment, step 818 is performed by characteristics 706, 708. In the example of FIG. 7, attribute 1 of characteristic 706 is local to managed object 204. Characteristic 706, therefore, can respond to the request of the message element 400 passed to it by body 206. Attribute 2 of characteristic 708, on the other hand, is a logical representation of attribute 2, which originates from managed object 502 in characteristic 712. In the preferred embodiment, in order for managed object 204 to respond adequately to the CLI request message 704 for attributes 1 and 2, therefore, managed object 204 must retrieve the data members of attribute 2 from managed object 502 on network element 108a.

Examples of attributes local to managed object 204 include: faults that the network manager 106 issues, the name of the managed object, and other such values that the network management layer 102 needs in order to provide information to the user, but which network elements 108a–108n do not need in order to provide data associated with the network elements 108a–108n, in response to requests. Often, however, data requested by get-attribute messages, or action messages, is not available at managed object 204 on network manager 106. Examples of such data are the frame error rate, the severely errored seconds, or any other data collected at network elements 108a–108n. In such cases, it is necessary for managed object 204 on network manager 106 to send a request to network element layer 104 in order to retrieve the information necessary to fulfill the request.

If in step 818, it is determined that characteristics 706, 708 can fulfill CLI request message 704 received by network manager 106, then in step 832, managed object 204 responds to CLI request message 704 with CLI response message 716 which includes the data requested. Since the transaction with CLI 702 has been completed, in step 834, managed object 204 deletes the major row 602 in partial response table 600.

If, on the other hand, characteristics 706, 708 determine that the CLI request message 704 cannot be fulfilled at managed object 204, the process continues at step 820. In the particular example of FIG. 7, attribute 1 of characteristic 706 is a network management layer characteristic. The data members of characteristic 706, therefore, are available on managed object 204. In Step 822, characteristic 706 responds to message element 400 by forwarding a request for a message to body 206. In the present example, characteristic 708 has determined that the data members of attribute 2 are not available and must be retrieved from network element 108a. Characteristic 708 passes to body 206 the values necessary to formulate managed object request message 710 to retrieve the data members of attribute 2 from managed object 502 on network element 108a.

In Step 822, body 206 generates managed object request message 710. In Step 824, managed object 204 adds minor row 604a to partial response table 600. Minor row 604a includes XID 304, OID 302 and ID 402 associated with characteristic 708 of managed object 204, and the data requested from network element 108a. Minor row 604a serves as a place holder at the managed object 204 for the outstanding request to another network entity.

Although the example of FIGS. 7 and 8 show a single attribute request forwarded to network element 108a, often a single CLI request message 704 results in multiple minor rows 604a–604n being added to partial response table 600, associated with major row 602. Each minor row 604a–604n is associated with a particular managed object request message 710. In such cases, multiple managed object request messages 710 are sent to multiple network entities in network management system 100. Furthermore, a single minor row 604a may represent the consolidation of multiple requests to a single network element 108a. For example, multiple requests for attributes on a single network element 108a may be consolidated into a single managed object request message 710 at minor row 604a, resulting in a more efficient method of handling management messaging between network entities.

In Step 826, managed object 204 sends managed object request message 710 to managed object 502 at network element 108a. Managed object 502 processes managed object request message 710 in the manner described above. Managed object request message 710 may result in the generation of additional request messages which, in turn, are sent to additional network entities. The additional request messages are generated in response to requests for characteristics not owned by network element 108a. In such cases, CLI request message 704 can result in a cascade of request and response messages throughout network management system 100. One of the advantages of the present invention is that a single implementation of the partial response table system and method manages and tracks the outstanding messages in network management system 100 at all levels in the network management hierarchy.

In Step 830, managed object 504 sends, and managed object 204 receives, managed object response message 714. In Step 830, minor row 604a associated with managed object request message 710 is deleted upon the receipt of managed object response message 714. In Step 832, network manager 106 generates the CLI response message 716 and sends it to CLI 702 after managed object 204 processes managed object response message 714 in order to update the data members of attribute 2 of characteristic 708. CLI response message 716 includes the data requested by CLI request message 704. CLI response message 716 concludes the transaction between CLI 702 and network management system 100. in Step 834, after the CLI response message 716 has been transmitted, major row 602 corresponding to CLI request message 704 in partial response table 600 is deleted.

Figure 9:
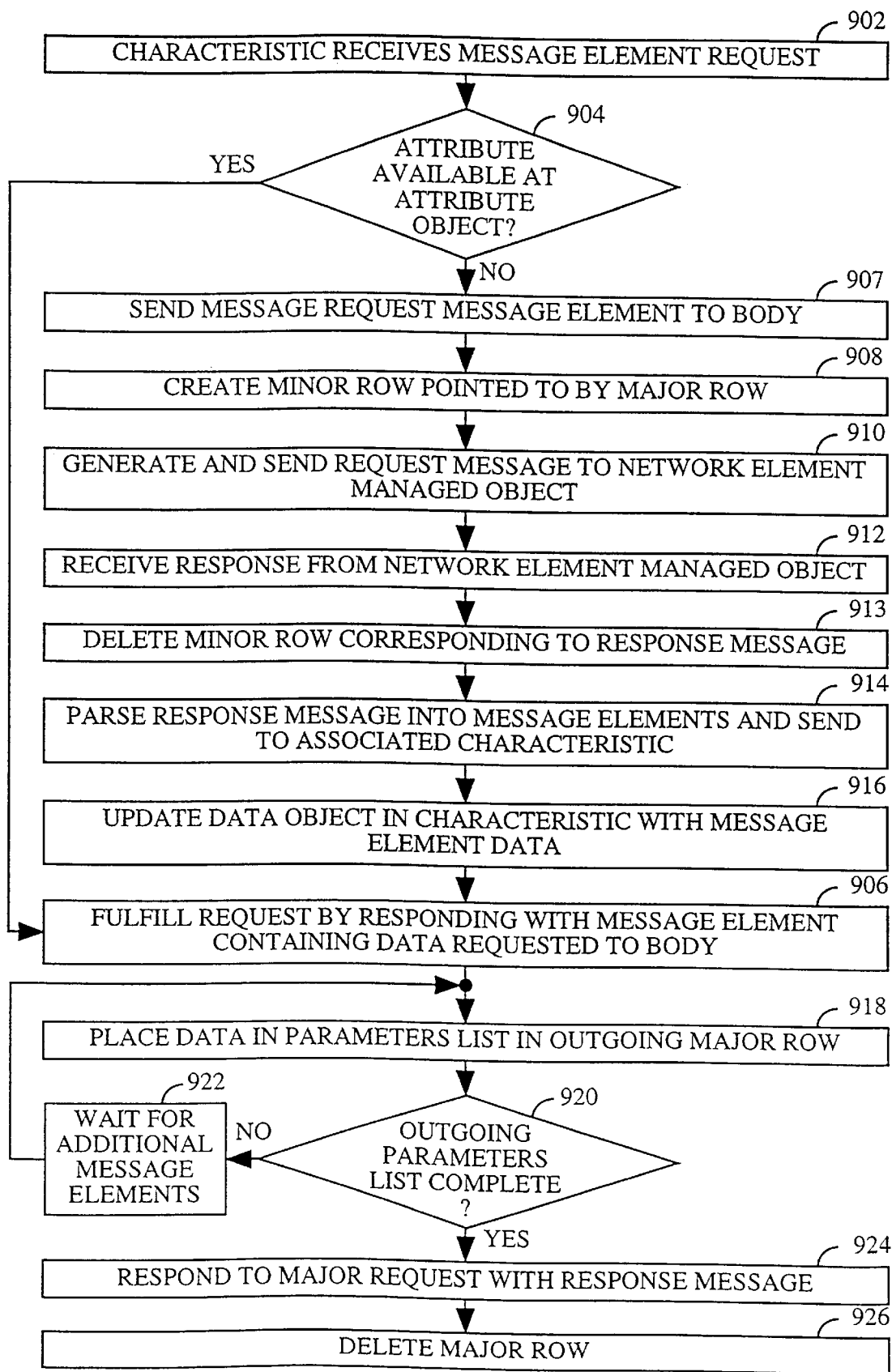
FIG. 9 is a flowchart illustrating the process of adding and deleting major and minor rows to a partial response table.

FIG. 9 further illustrates steps 816–832, the process of adding and deleting the major and minor rows of partial response table 600 in response to message elements 400. The process of FIG. 9 is adapted for handling messages 300 directed to attribute 706 and attribute 708. Characteristic 708 receives message element 400 at step 902. Step 904 determines whether the attribute requested by message element 400 is available at characteristic 708. If step 904 determines the attribute is available at characteristic 708, step 906 fulfills the request by sending a message element 400 containing the data requested to body 206. Step 918 places the data from the message element in parameters list 606 in the major row 602 corresponding to CLI request message 704.

Step 920 determines whether the outgoing parameters list 606 is complete, after parameters list 606 has been updated in step 924. The parameters list 606 will be complete after all of the attribute or action data has been received from characteristics 706, 708 so that CLI response message 716 may be sent. If parameters list 606 is not complete, the process continues at step 922 where body 206 waits for additional message elements sent from characteristic 708. As additional message elements are received from characteristic 708, the data is placed in parameters list 606 at step 918. Since CLI request message 704 may include a request for data from multiple characteristics, it should be noted that the process of FIG. 9 may be executed repeatedly for each CLI request message 704.

If step 920 determines parameters list 606 is complete, managed object 204 is ready to send CLI response message 716 to CLI 702. Step 924 responds to CLI request message 704 with CLI response message 716. Step 926 deletes major row 602 from the partial response table 600 because managed object 204 has responded to the original CLI request message 704. Multiple outstanding request messages to the managed object 204 will result in multiple major rows 602 in the partial response table 600. Major rows 602 of the partial response table 600 are deleted every time managed object 204 responds to the associated major CLI request message 704.

If step 904 determines that the attribute data member requested by the message element 400 received at characteristic 708 must be retrieved from a separate network entity, step 907 sends a request message element to body 206 requesting managed object request message 710 to body 206. Step 908 creates minor row 604a in response to step 907. Minor row 604a–604n points to and is pointed to by major row 602. The basis for the forward and backward pointers is a hash of the OID 304, XID 302 and ID 402. Step 910 generates managed object request message 710 at managed object 204. Managed object request message 710 is sent to network element 118 which contains the desired data members at characteristic 712. Managed object 502 of network element 118 responds to managed object request message 710 with the data requested using the same process that managed object 204 uses to respond to CLI request message 704. Managed object 502 may formulate additional request messages to be sent to additional network elements 110–120 or other network entities. When managed object 502 has retrieved or owns all of the data requested by managed object request message 710, managed object 502 responds with managed object response message 714.

Step 912 receives managed object response message 714 from network element 118. OID 302, XID 304, identify the major row 602 of partial response table 600 with which the managed object response message 714 is associated. ID and data 308a–308n of managed object response message 714 identify the particular ID 402 of minor rows 604a–604n with which the managed object response message 714 is associated. Step 913 deletes the associated minor row or rows 604a–604n in response to received managed object response message 714. Deletion of minor row 604a indicates managed object 204 has received a response to the managed object request message 710.

Step 914 parses managed object response message 714 into message elements and passes them to their associated characteristics 708 at body 206. Step 916 updates characteristic 708 and the data members of attribute 2 at step 916. Characteristic 708 then fulfills the original message element request as received in step 902. In the preferred embodiment, the parameters list 606 is updated by message element 400 from characteristic 708. In an alternative embodiment, the parameters list 606 may be updated after parsing the managed object response message 714, directly from the data received from managed object 502. After the data members of characteristic 708 have been updated, flow control of the process is passed to step 918, and the process proceeds as described above.

The process of FIG. 9 may be further adapted for subjugate messages. Subjugate messages are messages sent in response to response messages. For example, managed object 204 may send an additional action request message in response to managed object response message 714. In such a case, characteristic 708 would receive the message element containing the data from managed object 502. Characteristic 708 would determine that additional action (i.e., switching an additional cross-connect network element) is necessary and would send an additional message element 400 to body 206 requesting that an additional managed object request message be sent to the necessary network element 108a–108n. Another minor row 604b would be created, and the process repeats itself until the parameters list 606 is complete. Upon completion of the parameters list, the CLI response message 716 is generated and major row 602 is deleted from partial response table 600. Subjugate action messages provide for dynamic network configuration management because network manager 106 is able to change the implementation of CLI request message 704 depending on the response messages received from network elements 108a–108n.

Figure 10:
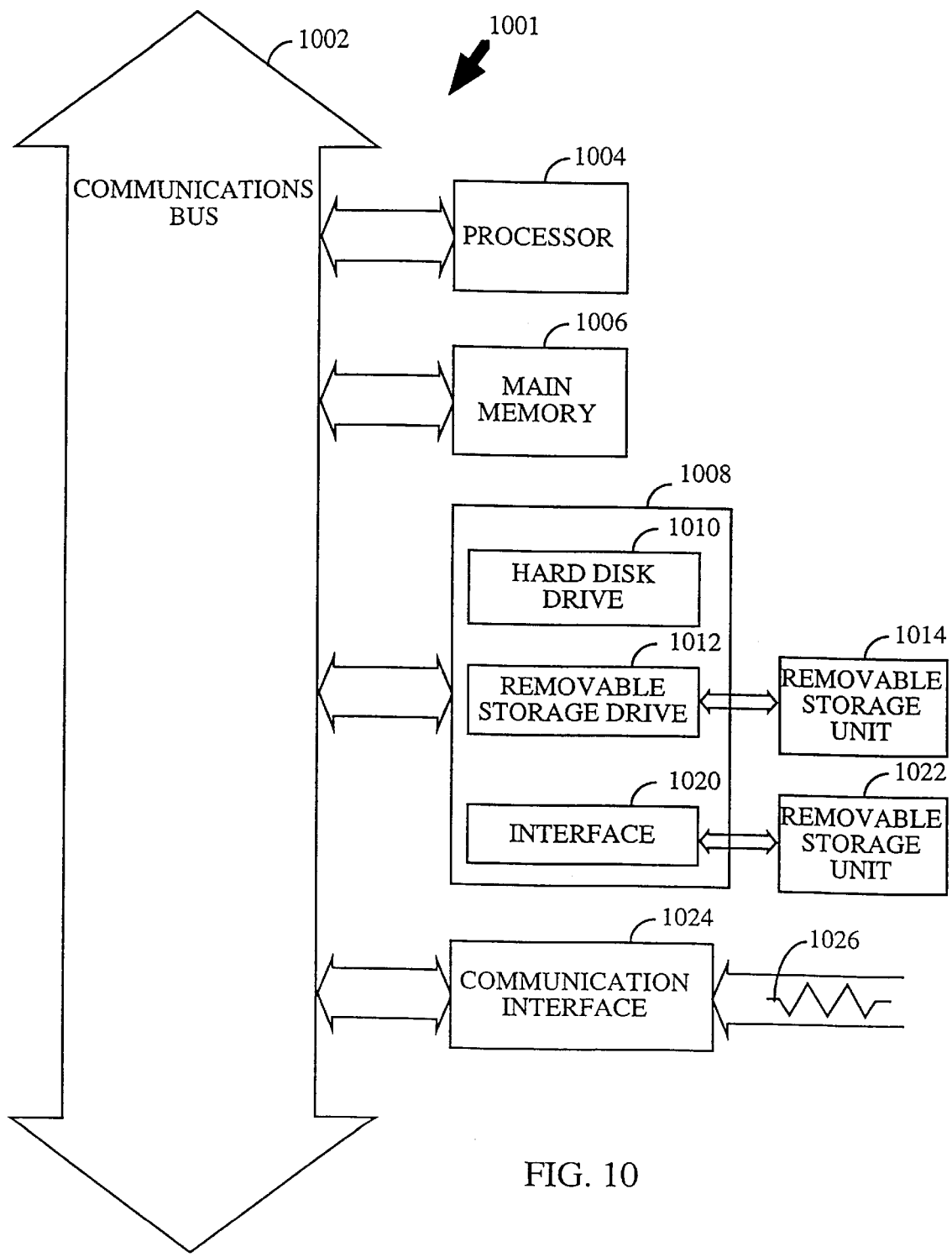
FIG. 10 is a block diagram illustrating one embodiment of a computer for implementing the present invention.

The present invention may be implemented using hardware, software or a combination thereof and may be implemented in a computer system or other processing system. In fact, in one embodiment, the invention is directed toward a computer system capable of carrying out the functionality described herein. An example computer system 1001 is shown in FIG. 10. The computer system 1001 includes one or more processors, such as processor 1004. The processor 1004 is connected to a communication bus 1002. Various software embodiments are described in terms of this example computer system. After reading this description, it will become apparent to a person skilled in the relevant art how to implement the invention using other computer systems and/or computer architectures.

Computer system 1002 also includes a main memory 1006, preferably random access memory (RAM), and can also include a secondary memory 1008. The secondary memory 1008 can include, for example, a hard disk drive 1010 and/or a removable storage drive 1012, representing a floppy disk drive, a magnetic tape drive, an optical disk drive, etc. The removable storage drive 1012 reads from and/or writes to a removable storage unit 1014 in a well known manner. Removable storage unit 1014, represents a floppy disk, magnetic tape, optical disk, etc. which is read by and written to by removable storage drive 1012. As will be appreciated, the removable storage unit 1014 includes a computer usable storage medium having stored therein computer software and/or data.

In alternative embodiments, secondary memory 1008 may include other similar means for allowing computer programs or other instructions to be loaded into computer system 1001. Such means can include, for example, a removable storage unit 1022 and an interface 1020. Examples of such can include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1001.

Computer system 1001 can also include a communications interface 1024. Communications interface 1024 allows software and data to be transferred between computer system 1001 and external devices. Examples of communications interface 1024 can include a modem, a network interface (such as an Ethernet card), a communications port, a PCMCIA slot and card, etc. Software and data transferred via communications interface 1024 are in the form of signals which can be electronic, electromagnetic, optical or other signals capable of being received by communications interface 1024. These signals 1026 are provided to communications interface via a channel 1028. This channel 1028 carries signals 1026 and can be implemented using wire or cable, fiber optics, a phone line, a cellular phone link, an RF link and other communications channels.

In this document, the terms "computer program medium" and "computer usable medium" are used to generally refer to media such as removable storage device 1012, a hard disk installed in hard disk drive 1010, and signals 1026. These computer program products are means for providing software to computer system 1001.

Computer programs (also called computer control logic) are stored in main memory and/or secondary memory 1008. Computer programs can also be received via communications interface 1024. Such computer programs, when executed, enable the computer system 1001 to perform the features of the present invention as discussed herein. In particular, the computer programs, when executed, enable the processor 1004 to perform the features of the present invention. Accordingly, such computer programs represent controllers of the computer system 1001.

In an embodiment where the invention is implemented using software, the software may be stored in a computer program product and loaded into computer system 1001 using removable storage drive 1012, hard drive 1010 or communications interface 1024. The control logic (software), when executed by the processor 1004, causes the processor 1004 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While the invention has been particularly shown and described with reference to preferred embodiments thereof, it will be understood by those skilled in the relevant art that various changes in form and details may be made therein without departing from the spirit and scope of the invention.

What is claimed is:

1. In a network management system having a network manager and at least one network element, a message handling process, comprising the steps of:

receiving a client request, from a client application, at a first managed object;

determining if said client request can be fulfilled at said first managed object;

generating a managed object request corresponding to said client request at said first managed object in response if said step of determining determines that said client request can not be fulfilled at first managed object;

sending said managed object request to a second managed object;

receiving a managed object response from said second managed object; generating a client response fulfilling said client request; and sending said client response to said client application.

2. In a network management system having a network manager and at least one network element, a message handling system, comprising:

means for receiving a client request, from a client application, at a first managed object;

means for determining if said client request can be fulfilled at said first managed object;

means for generating a managed object request corresponding to said client request at said first managed object in response if said step of determining determines that said client request can not be fulfilled at first managed object;

means for sending said managed object request to a second managed object;

means for receiving a managed object response from said second managed object;

generating a client response fulfilling said client request; and means for sending said client response to said client application.

3. In a network management system having a network manager and at least one network element, a message handling process, comprising the steps of:

receiving a client request at a first managed object, at least part of said client request being fulfilled by a second managed object;

creating a major row in response to receiving the client request; and creating a minor row associated with a managed object request sent to said second managed object, said minor row;

(a) having an index that associates said minor row with said major row, and (b) correlating a response to said managed object request with said client request.

4. In a network management system having a network manager and at least one network element, a system for message handling, comprising:

means for receiving a client request at a first managed object, at least part of said client request being fulfilled by a second managed object;

means for creating a major row in response to receiving the client request; and means for creating a minor row associated with a managed object request sent to said second managed object, said minor row;

(a) having an index that associates said minor row with said major row, and
(b) correlating a response to said managed object request with said client request.

* * * * *